United States Patent
Saeda et al.

(10) Patent No.: US 11,943,400 B2
(45) Date of Patent: *Mar. 26, 2024

(54) INFORMATION PROCESSING APPARATUS AND INFORMATION PROCESSING SYSTEM INCLUDING A DISPLAY THAT DISPLAYS PLURALITY OF CONTROL SCREENS

(71) Applicant: SHARP KABUSHIKI KAISHA, Sakai (JP)

(72) Inventors: Masao Saeda, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/983,219

(22) Filed: Nov. 8, 2022

(65) Prior Publication Data

US 2023/0054674 A1   Feb. 23, 2023

Related U.S. Application Data

(63) Continuation of application No. 17/124,024, filed on Dec. 16, 2020, now Pat. No. 11,528,371.

(30) Foreign Application Priority Data

Jan. 15, 2020 (JP) ................. 2020-004068

(51) Int. Cl.
*H04N 1/00* (2006.01)
*G06F 3/0482* (2013.01)
(Continued)

(52) U.S. Cl.
CPC ....... *H04N 1/00424* (2013.01); *G06F 3/0482* (2013.01); *G06F 3/04883* (2013.01);
(Continued)

(58) Field of Classification Search
None
See application file for complete search history.

(56) References Cited

U.S. PATENT DOCUMENTS

2007/0212097 A1   9/2007   Hoshino et al.
2007/0291298 A1   12/2007   Kodimer
(Continued)

FOREIGN PATENT DOCUMENTS

JP   2010-226301 A   10/2010
JP   2019-070939 A   5/2019
(Continued)

OTHER PUBLICATIONS

Notice of Allowance dated Aug. 10, 2022 for U.S. Appl. No. 17/124,024 which is the parent application of the Instant application.

(Continued)

*Primary Examiner* — Lennin R Rodriguezgonzalez
(74) *Attorney, Agent, or Firm* — ScienBiziP, P.C.

(57) ABSTRACT

The information processing apparatus includes a display. The information processing apparatus accepts user operations via a GUI (graphical user interface) displayed on the display. The operation screen is displayed on the display. On the operation screen, an operation guidance portion, including a message for providing operation guidance to the user, and a plurality of operation keys for accepting user operations are displayed. A part of the operation guidance portion is colored in a first color, the operation keys which are the first type of operation key are colored in the first color, and (Continued)

the operation keys which are the second type of operation key are not colored in the first color.

16 Claims, 13 Drawing Sheets

(51) Int. Cl.
    *G06F 3/04883*     (2022.01)
    *G06F 3/12*     (2006.01)
    *G06F 9/451*     (2018.01)
    *G06F 9/54*     (2006.01)

(52) U.S. Cl.
    CPC ............ *G06F 3/1253* (2013.01); *G06F 9/453* (2018.02); *G06F 9/542* (2013.01); *H04N 1/00411* (2013.01)

(56) References Cited

U.S. PATENT DOCUMENTS

| | | |
|---|---|---|
| 2010/0241648 A1 | 9/2010 | Ito et al. |
| 2019/0107926 A1 | 4/2019 | Sawano et al. |
| 2019/0116280 A1 | 4/2019 | Sawano et al. |
| 2019/0361654 A1 | 11/2019 | Saeda et al. |

FOREIGN PATENT DOCUMENTS

| | | |
|---|---|---|
| JP | 2019-074937 A | 5/2019 |
| JP | 2019-202441 A | 11/2019 |

OTHER PUBLICATIONS

Non-final Rejection dated Apr. 14, 2022 for U.S. Appl. No. 17/124,024 which is the parent application of the Instant application.

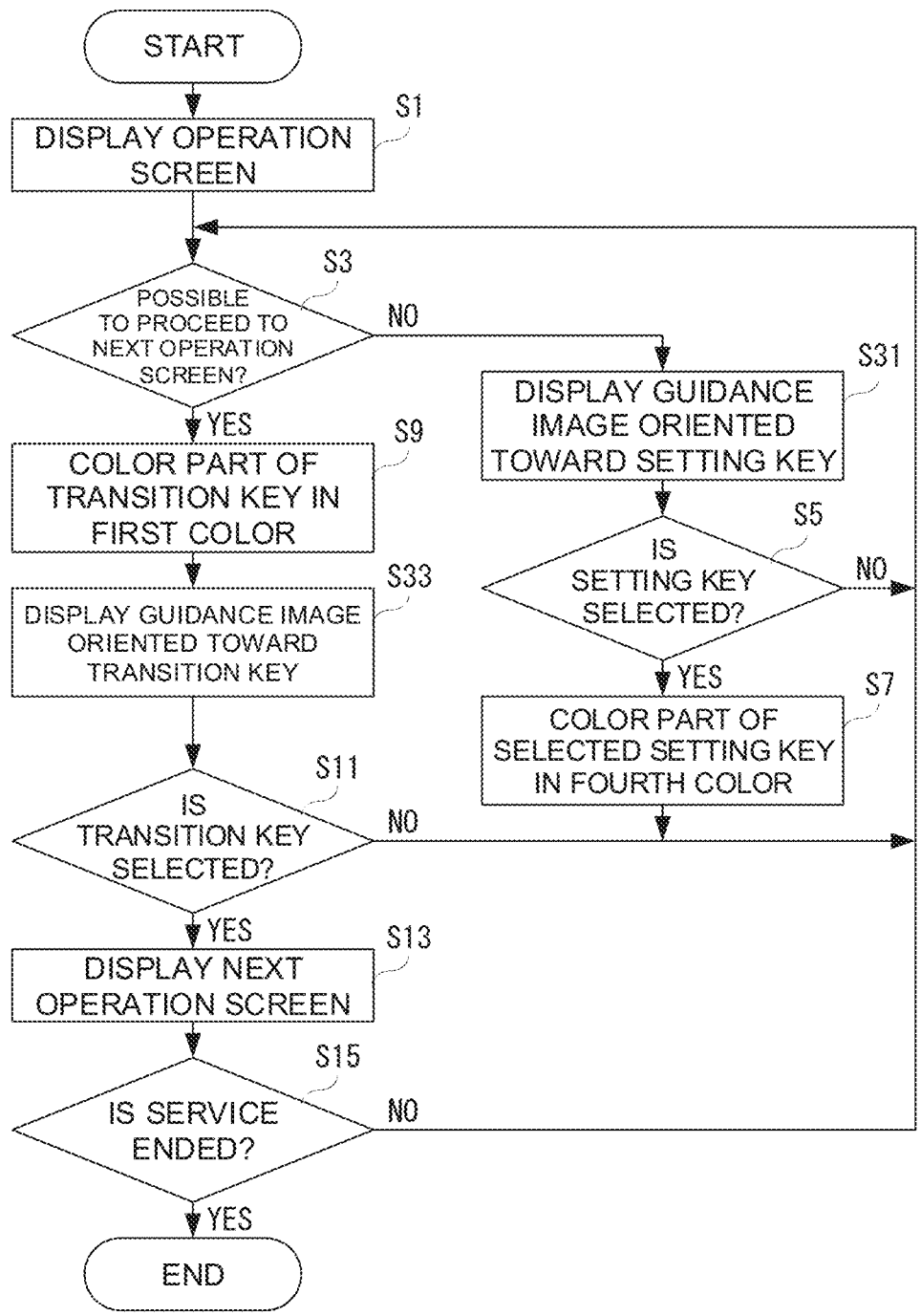

INFORMATION PROCESSING APPARATUS AND INFORMATION PROCESSING SYSTEM INCLUDING A DISPLAY THAT DISPLAYS PLURALITY OF CONTROL SCREENS

BACKGROUND OF THE INVENTION

Field of the Invention

The present application is a continuation application of U.S. patent application Ser. No. 17/124,024, filed on Dec. 16, 2020, which claims priority from Japanese Application 2020-004068, the content of which is hereby incorporated by reference into this application. The present invention relates to an information processing apparatus and an information processing system, and particularly to an information processing apparatus and an information processing system that provide a predetermined service to a user.

Description of the Background Art

An example of such according to the background art is disclosed in Japanese Unexamined Patent Publication No. 2010-226301. An image processing apparatus according to the background art includes a display and accepts user operations via a GUI (graphical user interface) displayed on the display. As the GUI, a plurality of operation screens related to a predetermined service provided by the image processing apparatus are sequentially displayed on the display. A plurality of operation keys for accepting user operations are displayed on each of the plurality of operation screens.

However, in the image processing apparatus according to the background art, a user who is unfamiliar with operations may mistakenly operate an unintended operation key, or hesitate to operate the operation key and take a long time on the operation, so there is room for improvement in terms of operability.

Therefore, a main object of the present invention is to provide a novel information processing apparatus and information processing system.

Another object of the present invention is to provide an information processing apparatus and an information processing system capable of improving operability in a GUI that includes a plurality of operation screens.

SUMMARY OF THE INVENTION

The first invention is an information processing apparatus that provides a predetermined service to a user, and includes a display and display controller for displaying an operation screen for executing the predetermined service, on the display. On the operation screen, an operation guidance portion including a message for providing operation guidance to the user and a plurality of operation keys for accepting user operations are displayed. At least a part of the operation guidance portion is colored in a first color. The plurality of operation keys include a first type of operation key that is colored in the first color and a second type of operation key that is not colored in the first color.

The second invention is an information processing apparatus dependent on the first invention, in which the operation guidance portion includes an indicator image arranged adjacent to the message and the indicator image is colored in the first color.

The third invention is an information processing apparatus dependent on the first or second invention, and a part of the first type of operation key is colored in the first color.

The fourth invention is an information processing apparatus dependent on the first invention, and the first type of operation key includes a transition key to which a function for advancing to the next operation screen is assigned.

The fifth invention is an information processing apparatus dependent on the fourth invention in which the display area of the display is rectangular, and the operation guidance portion is arranged along a first side of the display area and the transition key is arranged along a second side, from among the sides of the display area, opposite the first side.

The sixth invention is an information processing apparatus dependent on the fifth invention, in which the operation guidance portion is arranged in a first corner portion from among the corner portions of the display area, and the transition key is arranged in a second corner portion, from among the corner portions of the display area, opposite the first corner portion.

The seventh invention is an information processing apparatus dependent on the fourth invention, in which the display controller switches a plurality of operation screens and displays them on the display and when the condition for advancing to the next operation screen is not satisfied, the transition key is colored in a color different from the first color, and when the condition for advancing to the next operation screen is satisfied, the transition key is colored in the first color.

The eighth invention is an information processing apparatus dependent on the first invention, and the first type of operation key includes a setting key for setting an operating condition for a predetermined service and the setting key is colored in the first color when operated.

The ninth invention is an information processing system that includes an information processing apparatus according to the first invention and an image forming apparatus capable of communicating with the information processing apparatus, and a predetermined service is executed by the cooperation of the information processing apparatus and the image forming apparatus.

According to the present invention, it is possible to improve operability in a GUI that includes a plurality of operation screens.

The above object, other objects, features, and advantages of the present invention will be more apparent from the following detailed description of embodiments with reference to the drawings.

BRIEF DESCRIPTION OF THE DRAWINGS

FIG. 15 is a flow chart showing an example of information processing in the second embodiment.

DESCRIPTION OF THE PREFERRED EMBODIMENTS

First Embodiment

Figure 1:
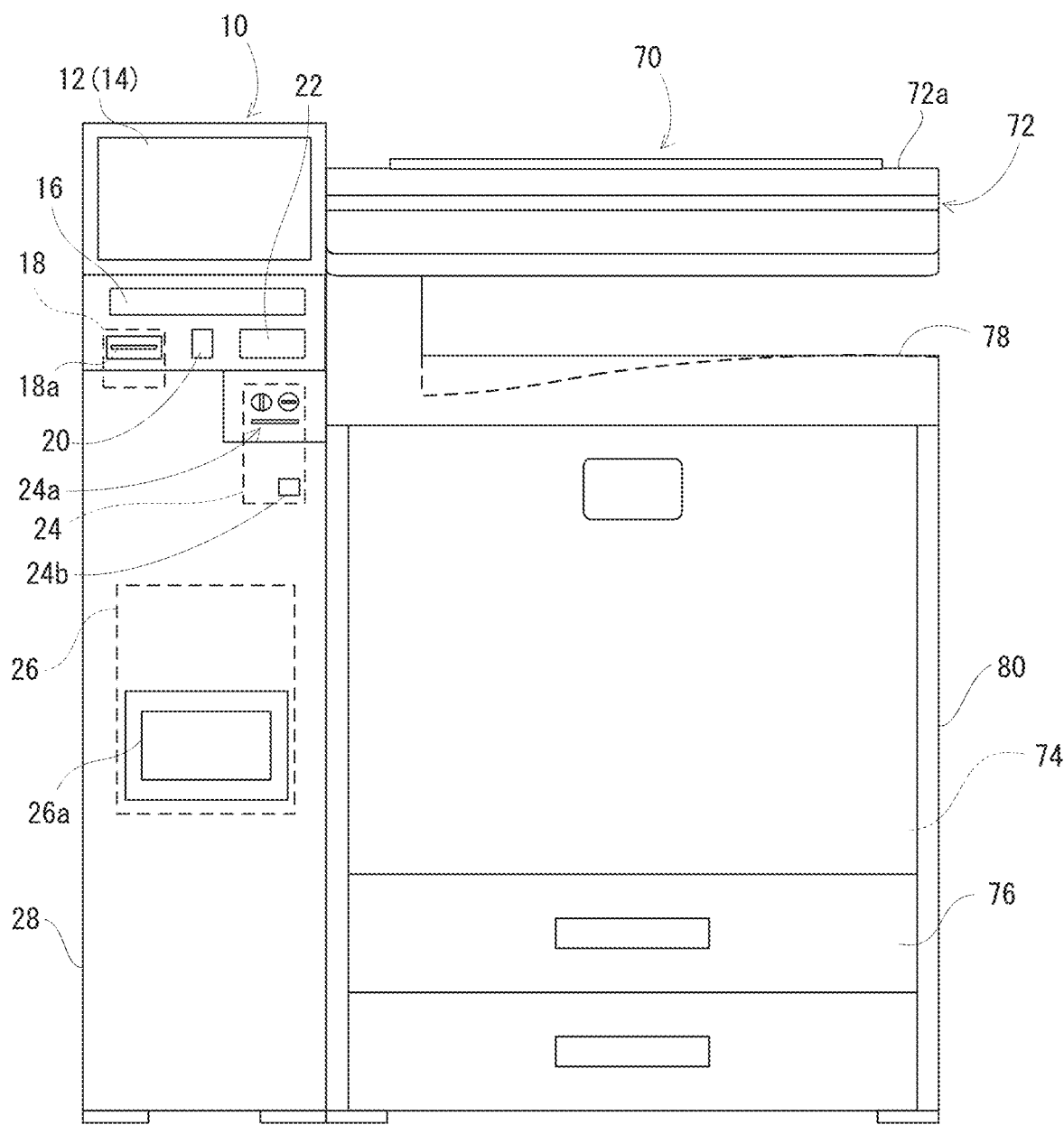
FIG. 1 is an illustrative view showing an external configuration of an information processing system according to an embodiment of the present invention.

FIG. 1 is a diagram illustrating an example of a configuration of an information processing system 100 according to the present invention. Referring to FIG. 1, the information processing system 100 according to the first embodiment of the present invention includes an information processing apparatus 10 and an image forming apparatus 70.

The information processing apparatus 10 is a multimedia kiosk (MMK) terminal arranged in stores such as a supermarket, a restaurant or a convenience store, and public facilities such as a station, a bus terminal, an airport, a government office or a library. The information processing apparatus 10 provides a person who is a user (user) with various information or a predetermined service (function) according to the place where the information processing apparatus 10 is arranged. Further, as will be described in detail later, the information processing apparatus 10 can also provide predetermined services such as copying, printing, scanning, and faxing to the user in cooperation with the image forming apparatus 70.

In this specification, the front-rear direction (depth direction) of the information processing apparatus 10 and its constituent members is defined by the surface facing the user's standing position, that is, the surface on the side where the display 14 described later is provided, being the front surface (front). The left-right direction (horizontal direction) of the information processing apparatus 10 and its constituent members is defined based on the state in which the user sees the information processing apparatus 10. These matters also apply to the image forming apparatus 70.

The information processing apparatus 10 includes an apparatus main body 28 including a display 14 with a touch panel 12, a storage medium connection unit 16, a paper-piece printer 18, a code reader 20, a short-range communication unit 22, a currency processing unit 24, and a photographic printer 26.

The display 14 with the touch panel 12 is arranged at the upper end of the information processing apparatus 10 (apparatus main body 28). The touch panel 12 is a general-purpose touch panel, and may employ any type of touch panel such as an electrostatic capacitance type, an electromagnetic induction type, a resistance film type, and an infrared type.

In the first embodiment, an electrostatic capacitance type touch panel is employed as the touch panel 12, and the touch panel 12 is provided on the display surface of the display 14. However, a touch panel display in which the touch panel 12 and the display 14 are integrally formed may be employed. Further, an LCD or an electro-luminescence (EL) display can be employed as the display 14.

The display 14 has a rectangular display area, and software keys (operation keys) for accepting user operations are displayed in this display area. A software key is, for example, a key (icon) reproduced by software on the display surface of the display 14 with the touch panel 12.

The storage medium connection unit 16 includes a mounting unit (for example, a drive and a memory slot) for mounting various storage media. Various storage media include optical disks (such as CD-R, DVD-R and BD-R) and flash memory (such as USB memory, SD memory cards and memory sticks). Notably, optical discs are mounted in the drive. Also, flash memory is mounted in the memory slot.

The paper-piece printer 18 (third image forming unit) is, for example, a thermal printer (heat-sensitive printer) or a dot impact printer, that issues a piece of paper on which an image such as a receipt, a proof of purchase, a journal, or a coupon is printed. Specifically, the paper-piece printer 18 prints various character strings, images, code patterns (bar codes, etc.) on roll paper, and discharges printed paper-pieces from the paper ejection unit 18a.

The code reader 20 includes, for example, a laser scanner or a camera, and can read codes attached to a product, a card, a receipt, or the like, or codes displayed on the screen of a user terminal (mobile terminal). The codes that can be read by the code reader 20 include bar codes (one-dimensional bar codes) and two-dimensional codes (for example, QR codes (registered trademark), micro QR codes, DataMatrix, MaxiCode, VeriCode, etc).

The short-range communication unit 22 performs non-contact data communication wirelessly with a communication target such as an IC card (identification card, membership card, employee ID card, etc.) or a user terminal or the like in accordance with a communication standard such as ISO/IEC18092 (referred to as NFC (Near Field Communication)), for example. The communicable distance of the short-range communication unit 22 is approximately from several cm to several m. The short-range communication unit 22 transmits a signal (reading command) instructing the communication target to read the data stored in the communication target. The communication target transmits the requested data to the short-range communication unit 22 as a response to the reading command. Further, the short-range communication unit 22 transmits a signal (writing command) instructing the communication target to write, together with data (writing data) to be written, to the communication target. The communication target writes (stores) the received write data in the storage unit of the communication target according to the write command.

The currency processing unit 24 includes a currency insertion unit 24a and a coin return port 24b. The currency insertion unit 24a includes a coin insertion port, a bill insertion port, a change return lever, and the like, and is arranged below the short-range communication unit 22. The coins inserted into the coin insertion port and the bills inserted into the bill insertion port are classified according to type and stored in a predetermined currency storage unit (not shown). The currency storage unit includes a storage unit for coins and a storage unit for bills. When coins or bills are inserted, the amount of inserted money is calculated according to the type and number of coins stored in the storage unit for coins and the type and number of bills stored in the storage unit for bills. When a predetermined service or the like is executed in the information processing apparatus 10, the cost according to the content of the service is subtracted from the amount of inserted money, and the remainder of the amount of inserted money is calculated. When the change return lever is operated, coins or bills are returned according to the remainder of the amount of inserted money. However, the coins are returned through the coin return port 24b provided below the currency insertion unit 24a, and the bills are returned through the bill insertion port.

The photographic printer 26 (second image forming unit) is, for example, a dye-diffusion printer or an inkjet printer that prints an image on photographic paper (photograph paper). The photograph printed by the photographic printer 26 is discharged to the discharge unit 26a. However, image data stored in the storage medium connected to the storage medium connection unit 16, image data transmitted from an external computer, or the like, is used as the image data for forming an image on the paper. The size of the photograph printed by the photographic printer 26 is an L size, a 2L size, or the like.

Figure 2:
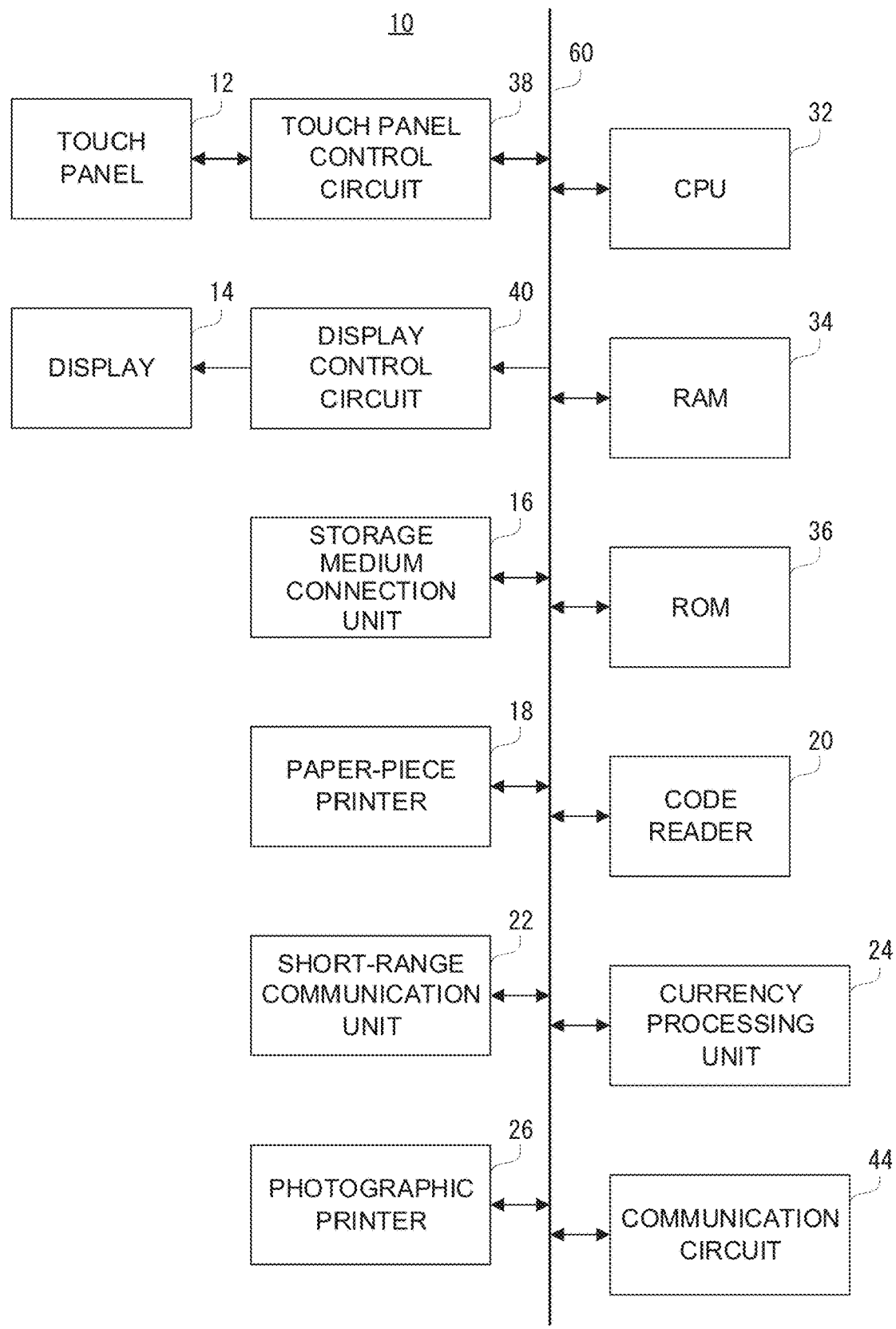
FIG. 2 is a block diagram illustrating an electrical configuration of the information processing apparatus illustrated in FIG. 1.

FIG. 2 is a block diagram illustrating an electrical configuration of the information processing apparatus 10 illustrated in FIG. 1. Referring to FIG. 2, the information processing apparatus 10 includes a CPU 32. The CPU 32 is connected via a bus 60 to the RAM 34, the ROM 36, the touch panel control circuit 38, the display control circuit 40, the storage medium connection unit 16, the paper-piece printer 18, the code reader 20, the short-range communication unit 22, the currency processing unit 24, the photographic printer 26 and the communication circuit 44. The touch panel control circuit 38 is connected to a touch panel 12, and the display control circuit 40 is connected to a display 14.

The CPU 32 manages the overall control of the information processing apparatus 10. The RAM 34 is used as a work area and a buffer area of the CPU 32. The ROM 36 stores default values for various information and the startup program of the information processing apparatus 10.

The touch panel control circuit 38 applies a voltage, or the like, necessary for the touch panel 12, detects a touch operation or a touch input within a valid touch range of the touch panel 12, and outputs, to the CPU 32, the touch coordinate data indicating the position of the touch input.

The display control circuit 40 includes a GPU, a VRAM, and the like. Under instructions from the CPU 32, the GPU generates, in the VRAM, display image data for displaying various screens on the display 14 using image generation data stored in the RAM 34, and outputs the generated display image data to the display 14.

The communication circuit 44 is a communication circuit for connecting to a network such as the Internet. The communication circuit 44 is a wired communication circuit or a wireless communication circuit, and communicates with an external computer (external terminal) such as a server via a network according to instructions from the CPU 32. However, the communication circuit 44 is wired or wireless (for example, infrared system, WiFi (registered trademark) system or Bluetooth (Bluetooth; registered trademark) system) without going through a network. It is therefore possible to directly communicate with the image forming apparatus 70, the user terminal, and the like.

Note that the electrical configuration of the information processing apparatus 10 illustrated in FIG. 2 is merely one example, and is not limiting.

Returning to FIG. 1, the image forming apparatus 70 is a multifunction device (MFP: Multifunction peripheral) having a photocopying function, a printer function, a scanner function, a facsimile function, or the like.

The image forming apparatus 70 includes an apparatus main body 80 including an image reader 72, an image forming unit 74, a paper feeding device 76, and a paper ejection tray 78. However, the image forming apparatus 70 is installed in the vicinity of the information processing apparatus 10. For example, the image forming apparatus 70 is provided adjacent to the right side of the information processing apparatus 10.

The image reader 72 includes a document placement table formed of a transparent material, and is inside the apparatus main body 80. A document holding cover 72a is attached above the document placement table so it can be opened and closed via a hinge or the like.

Further, the image reader 72 includes a light source, a plurality of mirrors, an imaging lens, a line sensor, and the like. The image reader 72 exposes the surface of the document to a light source, and guides the reflected light reflected from the surface of the document to the imaging lens with a plurality of mirrors. Then, the reflected light is imaged on the light receiving element of the line sensor by the imaging lens. The line sensor detects the brightness or chromaticity of the reflected light imaged on the light receiving element, and generates read image data based on the image on the surface of the document. As the line sensor, a CCD (Charged Coupled Device) or a CIS (Contact Image Sensor) or the like is used.

The image forming unit 74 (first image forming unit) is built in the apparatus main body 80 and is provided below the image reader 72. The image forming unit 74 includes a photoconductive drum, a charging device, an exposure device, a developing device, a transfer device, a fixing device, and the like. The image forming unit 74 forms an image by an electrophotographic method on a recording medium (paper) conveyed from the paper feeding device 76, or the like, and the paper with an image formed thereon is discharged to the paper ejection tray 78 provided between the image reader 72 and the image forming unit 74. However, the image data read by the image reader 72, the image data transmitted from the information processing apparatus 10, or the image data transmitted from an external computer (such as a server) is used as the image data for forming an image on the paper.

Figure 3:
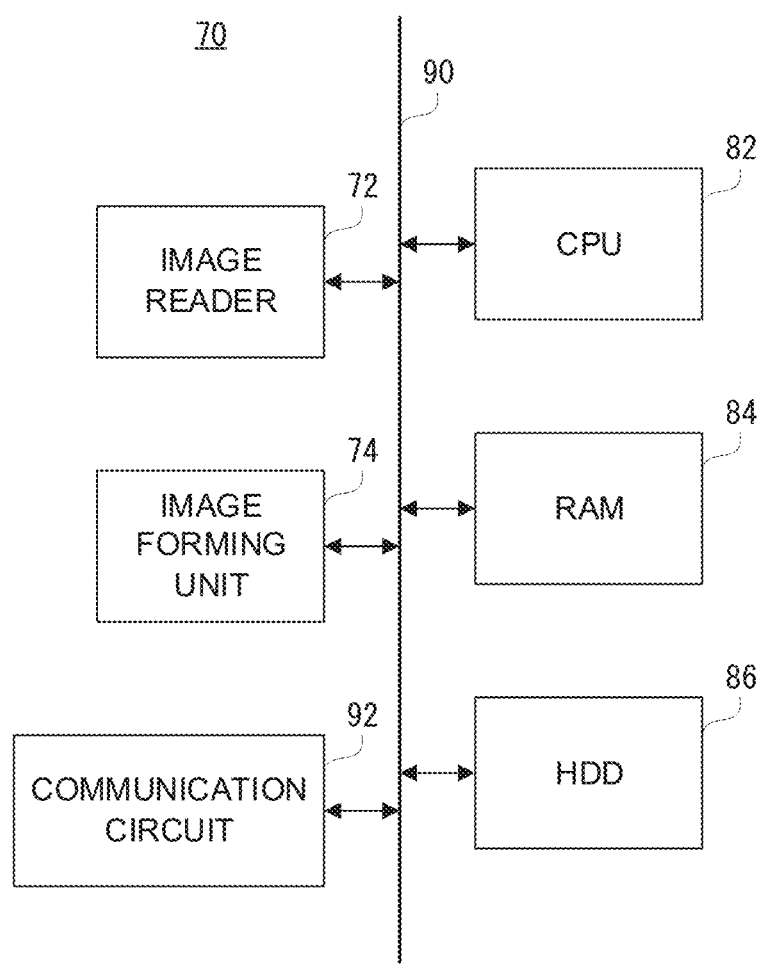
FIG. 3 is a block diagram illustrating an electrical configuration of the image forming apparatus illustrated in FIG. 1.

FIG. 3 is a block diagram illustrating an electrical configuration of the image forming apparatus 70 illustrated in FIG. 1. Referring to FIG. 3, the image forming apparatus 70 includes a CPU 82. The RAM 84, the HDD 86, the image reader 72, the image forming unit 74, and the communication circuit 92 are connected to the CPU 82 via the bus 90.

The CPU 82 manages the overall control of the image forming apparatus 70. The RAM 84 is used as a work area and a buffer area of the CPU 82.

The HDD 86 is the main storage device of the image forming apparatus 70, and stores, as appropriate, a control program for the CPU 82 to control the operation of each part of the image forming apparatus 70, display image data of various screens, and the like. However, other non-volatile memory such as SSD, flash memory, EEPROM may be used instead of the HDD 86 or together with the HDD 86.

The communication circuit 92 is a communication circuit for connecting to a network such as the Internet. The communication circuit 92 is a wired communication circuit or a wireless communication circuit, and communicates with an external computer such as a server via a network according to instructions from the CPU 82. However, the communication circuit 92 can also directly communicate with the information processing apparatus 10 wired or wirelessly without going through a network.

The electrical configuration of the image forming apparatus 70 illustrated in FIG. 3 is merely an example, and is not limiting.

In the information processing system 100 having such a configuration, the information processing apparatus 10 accepts user operations via the GUI displayed on the display 14. Specifically, an operation screen, including a plurality of operation keys, is displayed on the display 14 of the information processing apparatus 10, and user operations are accepted in response to touch input into the touch panel 12.

However, in a conventional information processing apparatus, a user who is unfamiliar with the operations of the apparatus may mistakenly operate an unintended operation key, or hesitate to operate the operation key and take a long time on the operation, so there is room for improvement in terms of operability.

Figure 4:
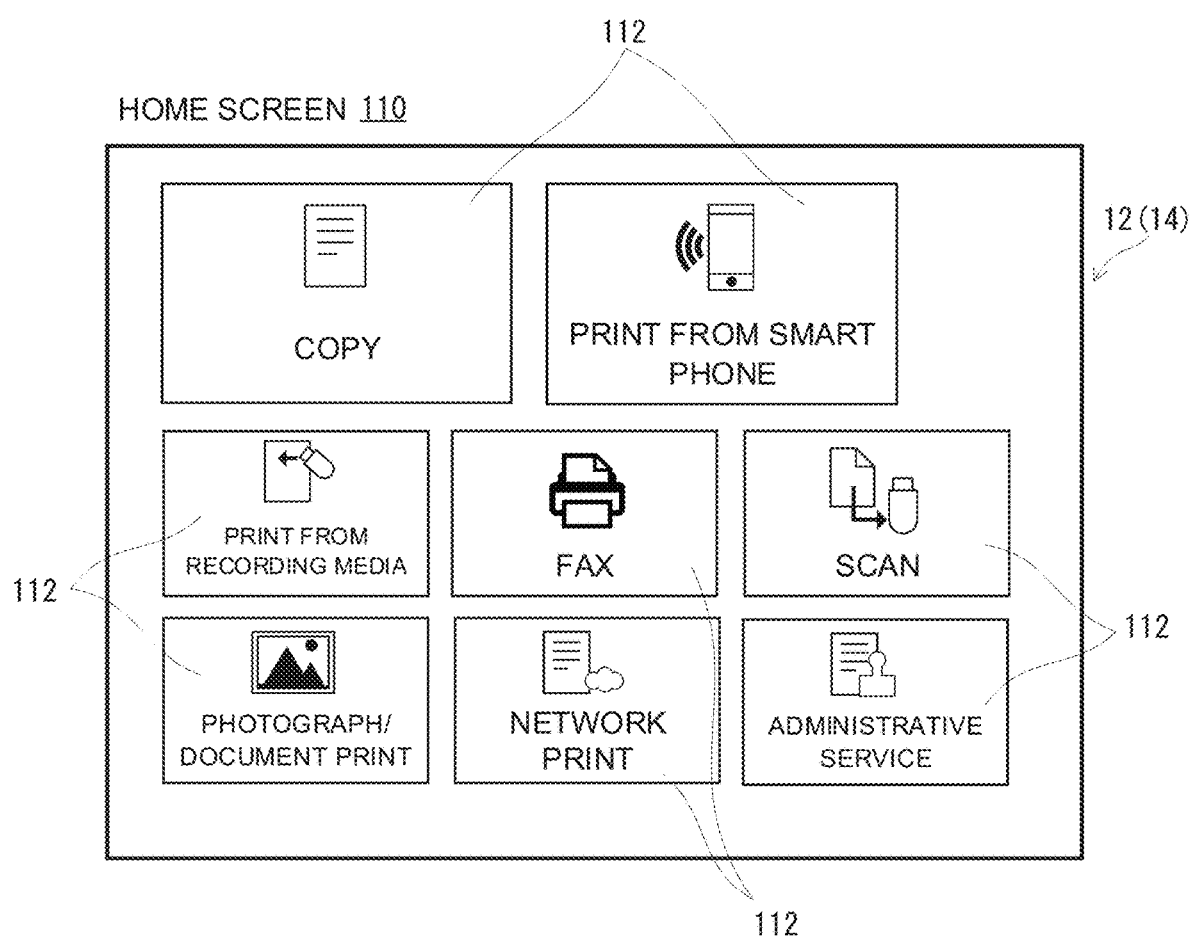
FIG. 4 is an illustrative view showing an example of a home screen.

Hereinafter, a specific operation example of the information processing system 100 will be described with reference to FIGS. 4 to 8. When in a standby state in which each function can be executed by turning on the main power of the information processing apparatus 10 and the image forming apparatus 70, the home screen 110 as shown in FIG. 4 is displayed on the display 14 of the information processing apparatus 10. The home screen 110 is an operation screen for selecting a service. On the home screen 110, a plurality of keys 112 for selecting a service provided by the information processing system 100 are displayed.

Each of the plurality of keys 112 is an image surrounded by a substantially rectangular frame, and functions as a software key. For each of the plurality of keys 112, a service such as "Copy", "Print from smartphone", "Print from recording media", "Fax", "Scan", "Photograph/document print", "Network print" and "Administrative service" is assigned.

The copy service includes a service for copying (photocopying) an image of a document such as paperwork on normal paper (normal copy service) and a service for copying a photograph image on photograph paper (photograph copy service). In addition, the "print from smartphone" service is a print service that uses image data stored in a mobile terminal such as a smartphone, and the "print from recording media" service is a print service that uses image data stored in a storage medium, and the "network print" service is a print service that uses image data transmitted from an external computer (server for network print service). Furthermore, "administrative service" is a print service that prints administrative certificates. In each print service, an image forming unit can be selected (specified) from a plurality of image forming units (for example, from an image forming unit 74 (first image forming unit) and a photographic printer 26 (second image forming unit)) to perform printing. For example, a selection screen including a selection key for selecting an image forming unit to print is displayed on the display 14 of the information processing apparatus 10, that is, choices are presented to the user for selecting an image forming unit to print from a plurality of image forming units and it is possible to print from the selected image forming unit.

When the key 112 is touched (operated) on the home screen 110, that is, when a service is selected, a plurality of operation screens for setting operating conditions of the selected service are sequentially displayed on the display 14. In the information processing apparatus 10 or the image forming apparatus 70, the service is executed according to the operating conditions set on the setting screen.

Figure 5:
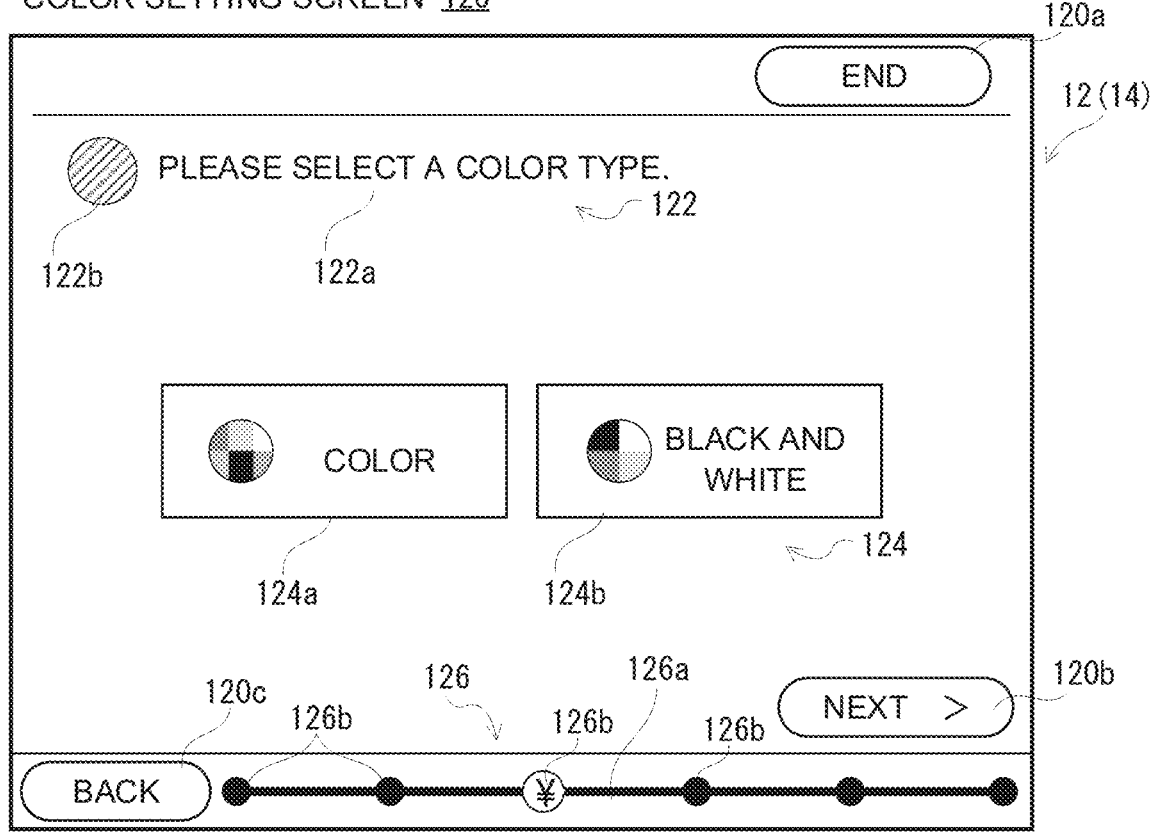
FIG. 5 is an illustrative view showing an example of a color setting screen.

For example, when the copy service is selected, that is, when the key 112 to which the copy service is assigned is operated (the copy service is selected), on the home screen 110, a plurality of operation screens (copy setting screens) for setting the operating conditions (copy conditions) of the copy service are sequentially displayed on the display 14. For example, the display 14 displays a color setting screen 120 as shown in FIG. 5.

The color setting screen 120 is a screen for setting a color mode (color condition) in the copy service, and is one of a plurality of operation screens for setting the operating conditions of the copy service. The color setting screen 120 includes an operation guidance portion 122, a setting unit 124, and a progress display bar 126 in addition to a plurality of operation keys (end key 120a, transition key 120b, and back key 120c).

The end key 120a is an operation key for ending the service that is being received. When the end key 120a is operated, the contents set up to that point are reset, and the home screen 110 is displayed on the display 14. This also applies to the end keys 130a and 140a described later.

Further, the end key 120a is configured to have a substantially rectangular frame (frame line), a background area surrounded by the frame, and a character string indicating setting content. However, the character string is arranged in the frame (background area). The same applies to the end keys 130a and 140a of other screens and other operation keys (transition key, setting key, and back key) described later.

The transition key 120b is an operation key for advancing (transitioning) to the next operation screen. However, the transition key 120b includes, in addition to the frame, the background area, and the character string, a graphic image having a predetermined shape indicating advancement to the next operation screen. Further, the graphic image is arranged in the background area. This also applies to the transition key 130b described later.

When the transition key 120b is operated, the display 14 displays the operation screen that comes after the operation screens previously displayed. This also applies to the transition keys 130b and 140b described later. However, depending on the type of operation screen, it is not possible, in some cases, to advance to the next operation screen unless the operating conditions of the service are set (selected). The screen for setting the operating conditions of the service is disabled until the operating conditions of the service are set. Since the color setting screen 120 is a screen for setting the operating conditions of the service, in the case of the color setting screen 120, the transition key 120b is disabled until the color conditions are set. Therefore, the transition key 120b cannot be operated until reaching a state where advancement to the next operation screen is possible, that is, until the color condition is set.

Further, the transition key 120b is arranged in a corner portion of the display area of the display 14. For example, it is arranged in the lower right corner portion of the display area of the display 14. In other words, the transition key 120b is arranged along the right side and the lower side of the display area of the display 14. The position of the transition key 120b in this embodiment is an example, and may be arranged at any of the upper right, upper left, and lower left corner portions of the display area of the display 14.

The back key 120c is an operation key for returning to the previous operation screen. When the back key 120c is operated, the content set on the operation screen is reset and the screen returns to the previous operation screen. When the back key 120c is operated on the first operation screen among the plurality of operation screens for setting the operating conditions, the set content is reset and the screen returns to the home screen 110. This also applies to the back keys 130c and 140c described later.

The operation guidance portion 122 includes a message (notification text) 122a and an indicator image 122b. The operation guidance portion 122 is arranged along a side opposite to the side along which the transition key 120b is arranged. For example, since the transition key 120b is arranged along the right side of the display area of the display 14 in the left-right direction, the operation guidance portion 122 is arranged along the left side of the display area of the display 14. Further, since the transition key 120b is arranged along the lower side of the display area of the display 14 in the vertical direction, the operation guidance portion 122 is arranged along the upper side of the display area of the display 14. That is, the operation guidance portion 122 is arranged along a corner portion opposite the corner portion along which the transition key 120b is arranged. For example, since the transition key 120b is arranged in the lower right corner portion of the display area of the display 14, the operation guidance portion 122 is arranged in the upper left corner portion of the display area of the display 14.

The example shown in FIG. 5 is merely an example, and the vertical relationship and the left-right relationship of the transition key 120b and the operation guidance portion 122 may be reversed. For example, the transition key 120b may be arranged at the lower left corner portion of the display area of the display 14, and the operation guidance portion 122 may be arranged at the upper right corner portion of the display area of the display 14. The positional relationship between the transition key 120b and the operation guidance portion 122 is the same for the transition keys 130b and 140b described later and the operation guidance portions 132 and 142 described later.

The message 122a is provided to provide operation guidance to the user. On the color setting screen 120, a message 122a such as, "Select a color type and click 'Next'." is displayed on the operation guidance portion 122 to prompt the selection of the color mode in the copy service.

The indicator image 122b is an image for attracting the user's attention to the operation guidance portion 122, and is displayed adjacent to the message 122a.

Further, at least either of the message 122a or the indicator image 122b, that is, a part of the operation guidance portion 122 is colored with a predetermined color (first color). In the example shown in FIG. 5, the indicator image 122b is colored in the first color (for example, yellow), and the message 122a is in the second color (for example, black) other than the first color. Conversely, the message 122a may be colored in a first color (such as yellow) and the indicator image 122b may be a second color (such as black). Further, both the indicator image 122b and the message 122a (all of the operation guidance portion 122) may be colored in the first color. Further, a frame line surrounding the message 122a and the indicator image 122b may be displayed. In this case, the frame line may be colored in the first color, or the area inside the frame line may be colored in the first color. In the present embodiment, the first color is yellow in order to attract the attention of the user, but a color other than yellow may be used if it can attract the attention of the user.

The setting unit 124 is provided for setting color conditions (color copy/black and white copy) in the copy service, and includes a plurality of setting keys (operation keys) to which color conditions, different from one another, are assigned. The setting unit 124 of the color setting screen 120 includes a setting key 124a to which the color copy setting is assigned and a setting key 124b to which the black and white copy setting is assigned. However, the setting keys 124a and 124b each include, in addition to a frame, a background area, and a character string, a graphic image of a predetermined shape (for example, a circle) indicating the setting content. Further, the graphic image is arranged in the background area. By operating any of these setting keys 124a and 124b, the condition for color in the copy service is set (selected).

However, each of the setting keys 124a and 124b included in the setting unit 124 is colored in a third color (for example, light gray) different from the first color and the second color in the state before being operated (selected). On the other hand, when each of the setting keys 124a and 124b is operated (selected), a part of each of them is colored in a fourth color (for example, blue) other than the first color, a second color, and a third color. That is, each of the setting keys 124a and 124b is colored in a fourth color according to the progress of the operation (setting operation) for setting the operating conditions. That is, when any of the setting keys 124a and 124b is operated, a part of the setting unit 124 (for example, the background area) is colored in the fourth color. As described above, the setting keys 124a and 124b are each not colored in the first color regardless of whether or not they are operated.

Figure 6:
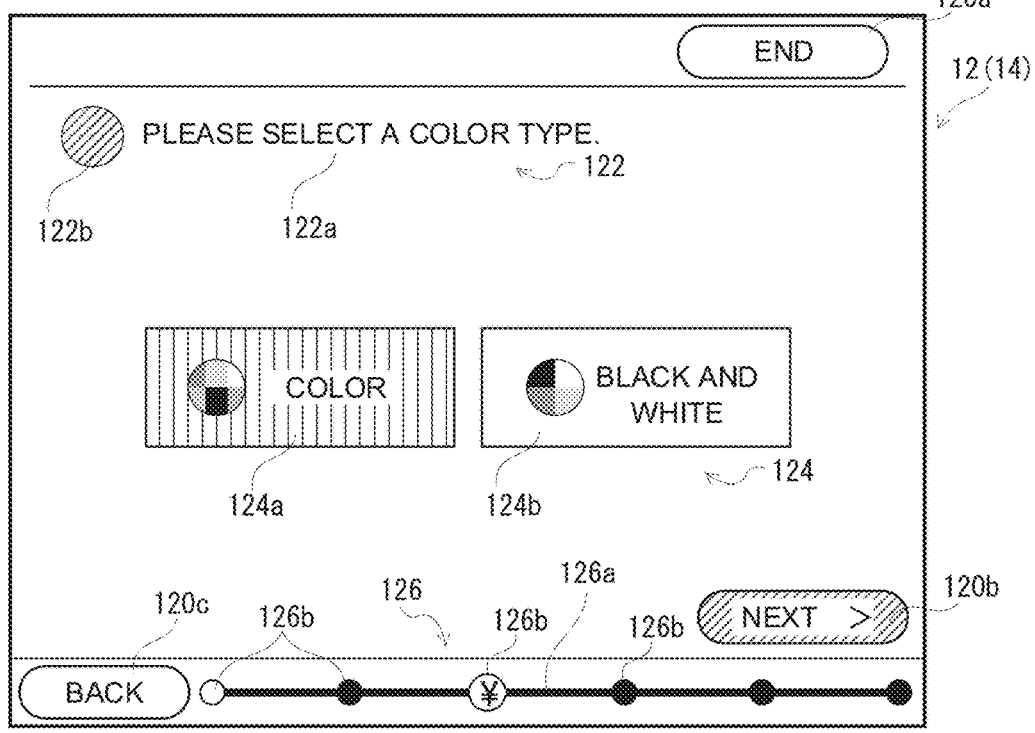
FIG. 6 is an illustrative view showing another example of a color setting screen.

Therefore, the user can intuitively recognize that the setting key colored in the fourth color is in the selected state. When the setting key 124a is operated, as shown in FIG. 6, the background area of the setting key 124a is colored in the fourth color, but this is not a limitation; the frame line, the graphic image or the character string of the setting key 124a may also be colored in the fourth color.

As described above, on the color setting screen 120, the transition key 120b is enabled when the color condition in the copy service is set. That is, when any of the setting keys 124a and 124b is operated, the transition key 120b is enabled. As shown in FIG. 5, the transition key 120b is colored in a color different from the first color (for example, a third color (light gray)) when in a state before being enabled. On the other hand, the transition key 120b is colored in the first color when enabled. That is, the transition key 120b is an operation key of the first type, to be colored in the first color, and a part of the transition key 120b is colored in the first color according to the progress of the setting operation. At this time, a part of the transition key 120b (for example, the background area) is colored in the first color, and the parts other than the part of the transition key 120b colored in the first color are in a color other than the first color (for example, a second color, black).

Therefore, the user is able to intuitively recognize from the display mode of the transition key 120b (a state in which a part of the transition key 120b is colored in the first color) that it is possible to advance to the next operation screen. In the example shown in FIG. 6, the background area of the transition key 120b is colored in the first color, but this is not a limitation, and the frame line or character string of the transition key 120b may be colored in the first color.

That is, in the state where the color condition in the copy service is set, a part of the operation guidance portion 122 and a part of the transition key 120b are in a state being colored in the same first color. Basically, an operation is required to advance to the next operation screen or to execute a service, and the operation key (guidance target key) for guiding the user becomes the first type of operation key colored in the first color, becoming. The transition key 120*b* is included in the first type of operation key colored in the first color because the transition key 120*b* is one of the guidance target keys.

Further, on the operation screen (here, the color setting screen 120), a part that is other than the operation guidance portion 122 and that is other than the transition key 120*b*, which is the guidance target key, is colored in a color different from the first color. Therefore, only a part of the operation guidance portion 122 and a part of the guidance target key are in a state of being colored in the first color, and the user can intuitively recognize that the transition key 120*b* is a key to be operated (guidance target key). This also applies to other operation screens (for example, the guidance screen 130 and the final setting screen 140) described later.

Further, in this embodiment, the end key 120*a*, the back key 120*c*, and the setting keys 124*a* and 124*b* are each not colored in the first color (which correspond to the second type of operation key). That is, the plurality of operation keys displayed on the operation screen include a first type of operation key colored in the first color and a second type of operation key not colored in the first color.

The above-mentioned setting keys 124*a* and 124*b* may be included as guidance target keys, and a part of each of the setting keys 124*a* and 124*b* may then be colored in the first color according to the progress of the setting operation (The setting keys 124*a* and 124*b* are included in the first type of operation key). This also applies to the other setting keys (the end key 120*a* and the back key 120*c*). However, not all the operation keys included in the operation screen are included as the first type of operation key (qualifies as the first type of operation key).

The progress display bar 126 is displayed at the lower end of the display area of the display 14. The progress display bar 126 is a status indicator that displays the progress of the setting operations at the present time. Specifically, the progress display bar 126 includes a straight bar portion 126*a* extending linearly in a lateral direction and a plurality of stage marks 126*b* arranged at predetermined intervals on the straight bar portion 126*a*. The position of each stage mark 126*b* corresponds to the progress of the setting operations. The straight bar portion 126*a* and the stage marks 126*b* are each given a suitable color according to the progress of the setting operations at the present time. For example, the color boundary attached to the straight bar portion 126*a* and the stage marks 126*b* moves in the direction in which the straight bar portion 126*a* extends (for example, in the left-right direction) according to the progress of the setting operation at the present time. Specifically, as the progress of the setting operation progresses, the color boundaries attached to the straight bar portion 126*a* and the stage marks 126*b* move toward one direction (for example, to the right), and as the progress of the setting operation recedes, the color boundaries attached to the straight bar portion 126*a* and the stage mark 126*b* move toward the other direction (for example, to the left). Therefore, the user can intuitively recognize the progress of the setting operations at the present time, from the display mode of the progress display bar 126. The above description about the progress display bar 126 also applies to the progress display bars 136 and 146, which will be described later.

Further, the transition key 120*b* is arranged adjacent to the end in one direction of the progress display bars 126 (direction indicating that the progress of the setting operation has progressed), and the back key 120*c* is arranged adjacent to the end in the other direction (toward the direction indicating that the progress of the operations has receded) of the progress display bar 126. That is, the transition key 120*b* and the back key 120*c* are in the same area as that of the progress display bar 126 (the lower end of the display area of the display 14), and are arranged on opposite sides with the progress display bar 126 in between. Further, the transition key 120*b* is arranged toward the direction indicating that the progress of the setting operation has progressed, when viewed from the progress display bar 126, and the back key 120*c* is arranged toward the direction indicating that the progress status of the setting operation has receded, when viewed from the progress display bar 126.

Then, when the enabled transition key 120*b* is operated, the operation screens after the color setting screen 120 are sequentially displayed on the display 14.

Figure 7:
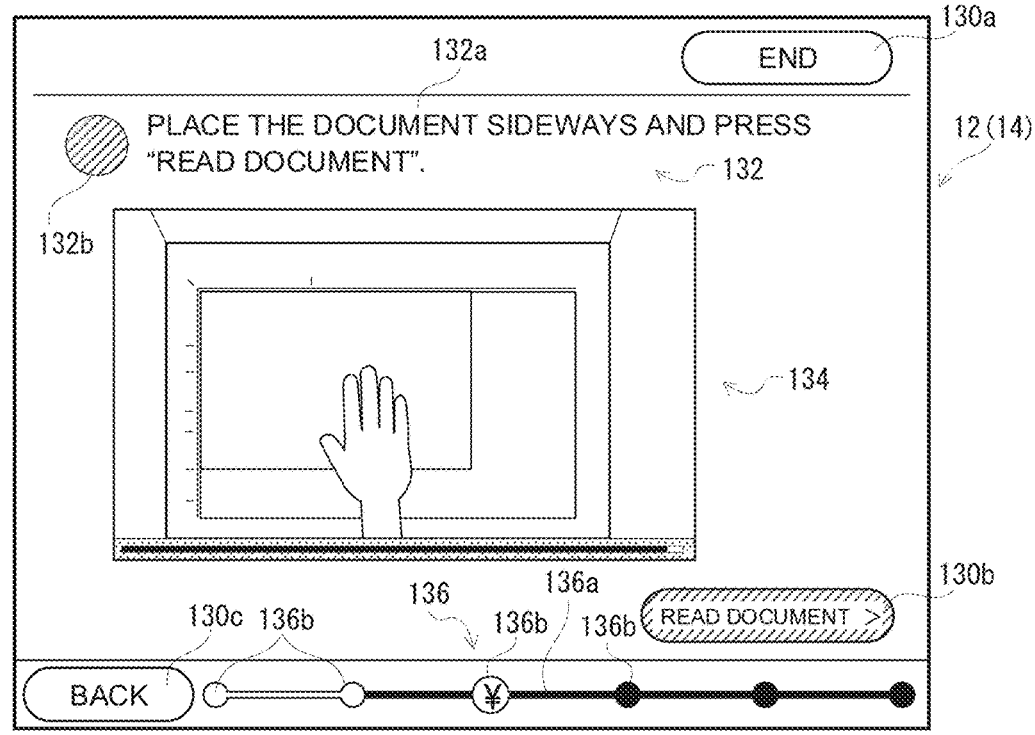
FIG. 7 is an illustrative view showing an example of a guidance screen.

Then, at the stage of reading the document, the guidance screen 130 is displayed on the display 14 as shown in FIG. 7. The guidance screen 130 is a screen for providing guidance (guiding) the document setting (placement) method, and includes the end key 130*a*, the transition key 130*b*, the back key 130*c*, the operation guidance portion 132, the placement method guidance portion 134, and the progress display bar 136.

On the guidance screen 130, a message 132*a* such as "Place the document sideways and press 'Read document'." is displayed on the operation guidance portion 132 to prompt the appropriate setting of the document and of the start operation for the document reading. Further, on the placement method guidance portion 134, a guidance image (still image or moving image) is displayed to provide guidance for the placement of the document on the document placement table at an appropriate position and in an appropriate orientation (to provide operation guidance to the user).

Since the guidance screen 130 is not a screen for setting the operating conditions of the service, the transition key 130*b* is enabled from the beginning. That is, on the guidance screen 130, it is possible to proceed to the next operation screen from the beginning. The transition key 130*b* is one operation key of the first type, and a part of the transition key 130*b* is colored in the first color from the beginning. Further, on the guidance screen 130, the operation keys (end key 130*a* and back key 130*c*) other than the transition key 130*b* are operation keys of the second type and are not colored in the first color. Therefore, the user can intuitively recognize from the display mode of the transition key 130*b* that the transition key 130*b* is a key to operate (guidance target key). A preview screen displaying the read document image after reading the document, for example, is an example of such a screen in which the transition key, which is an operation key of the first type, is enabled from the beginning and a part of the transition key is colored in the first color from the beginning.

Further, the transition key 130*b* is assigned the function of starting (executing) reading of a document in addition to the function of advancing to the next operation screen. That is, the transition key 130*b* is also a reading start key for accepting the operation to start reading the document. Therefore, when the transition key 130*b* is operated, the document reading starts, the image data read by the image reader 72 is generated and the operation screens after the guidance screen 130 are sequentially displayed on the display 14.

Figure 8:
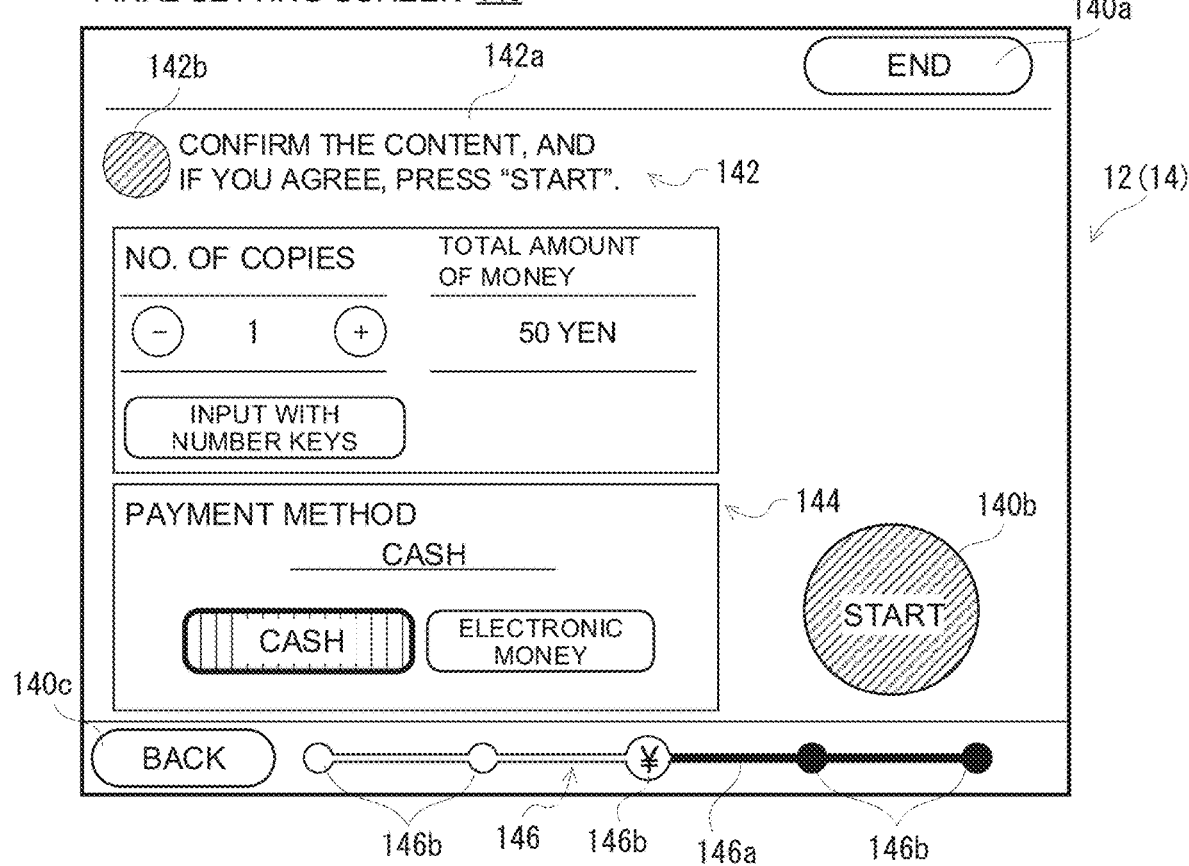
FIG. 8 is an illustrative view showing an example of a final setting screen.

Then, when the operating conditions necessary for executing the service are set, the final setting screen 140 is displayed on the display 14 as shown in FIG. 8 The final setting screen 140 is a screen for confirming the operating conditions set on each of the previous operation screens such as the color setting screen 120 and for finally determining the operating conditions, and includes an end key 140a, a transition key 140b, a back key 140c, an operation guidance portion 142, a setting unit 144 and a progress display bar 146.

On the final setting screen 140, a message 142a such as "Confirm the content, and if you agree, press 'Start'." is displayed on the operation guidance portion 142 to prompt confirmation of the operating conditions. Further, in the setting unit 144, a setting key is displayed for setting the number of copies to be printed and setting the payment method (for example, a cash key for setting the payment method to cash and an electronic money key for setting the payment method to electronic money).

In addition to a function of advancing to the next operation screen, the transition key 140b is assigned a function of starting (executing) a job (in this case, a copy job) related to the main service under the set operating conditions. That is, the transition key 140b is also a start key for accepting the start operation of the copy job.

Further, on the final setting screen 140, when the transition key 140b qualifies as the first type of operation key, and the number of copies to be printed and the payment method are set, the transition key 140b is enabled and a part of the transition key 140b is in a state of being colored in the first color. Further, on the guidance screen 130, the operation keys other than the transition key 130b (the end key 140a, the back key 140c, and the setting key included in the setting unit 144) are the second type of operation keys and are not colored in the first color. Therefore, the user can intuitively recognize from the display mode of the transition key 140b that the transition key 140b is a key to operate (guidance target key). Then, when the transition key 140b is operated, the copy job starts.

As described above, the display mode of the operation screen for setting the operating conditions has been described by taking the color setting screen 120, the guidance screen 130, and the final setting screen 140 as examples, but the operation screen for setting the operating conditions may include screens other than these.

For example, on the operation screen for setting the operating conditions of the copy service, screens such as a paper setting screen, for setting the size of the copy paper (paper size); a preview screen for confirmation of the read image data (print image data) based on the image of the surface of the document; an execution notification screen for notifying the user that the copy job is being executed; and a completion notification screen for notifying the user that the copy job is completed; may also be included. Also on these screens, the operation guidance portion corresponding to the operation guidance portions 122, 132, 142 and the transition key corresponding to the transition keys 120b, 130b, 140b are displayed. Further, on each operation screen, setting keys (corresponding to setting keys 124a and 124b) for setting the operating conditions to be set on each operation screen may also be displayed. In this case, when in a state before being operated, the entirety of the setting key is colored in a color different from the first color (for example, light gray being the third color). Then, when the setting key is operated, a part of the setting key may be colored in a fourth color (for example, blue), or a part of the setting key may be colored in a first color (for example, yellow). Furthermore, on a screen for setting service operating conditions such as the paper setting screen, the transition key is disabled until the printing paper conditions are set, and cannot be operated unless the printing paper conditions are set. On the other hand, on screens that are not screens for setting service operating conditions, such as the preview screen, execution notification screen, and completion notification screen, the transition key is enabled from the beginning, and a part is colored in the first color from the beginning.

In addition, although a plurality of operation screens for setting the operating conditions for the copy service have been described as an example, a plurality of operation screens may also be used for setting the operating conditions of services other than the copy service. On such other plurality of operation screens, an operation guidance portion corresponding to the operation guidance portion 122 or the like and a transition key corresponding to the transition key 120b or the like may be displayed. Further, even on a plurality of operation screens for setting operating conditions of services other than the copy service, setting keys for setting operating conditions to be set may be displayed on each operation screen.

The above-described operation of the information processing system 100 is implemented when the CPU 32 of the information processing apparatus 10 executes an information processing program for the information processing apparatus 10 stored in the RAM 34, and the CPU 82 of the image forming apparatus 70 executes an information processing program for the image forming apparatus 70 stored in the RAM 84. The specific processing will be described later using a flow chart.

Figure 9:
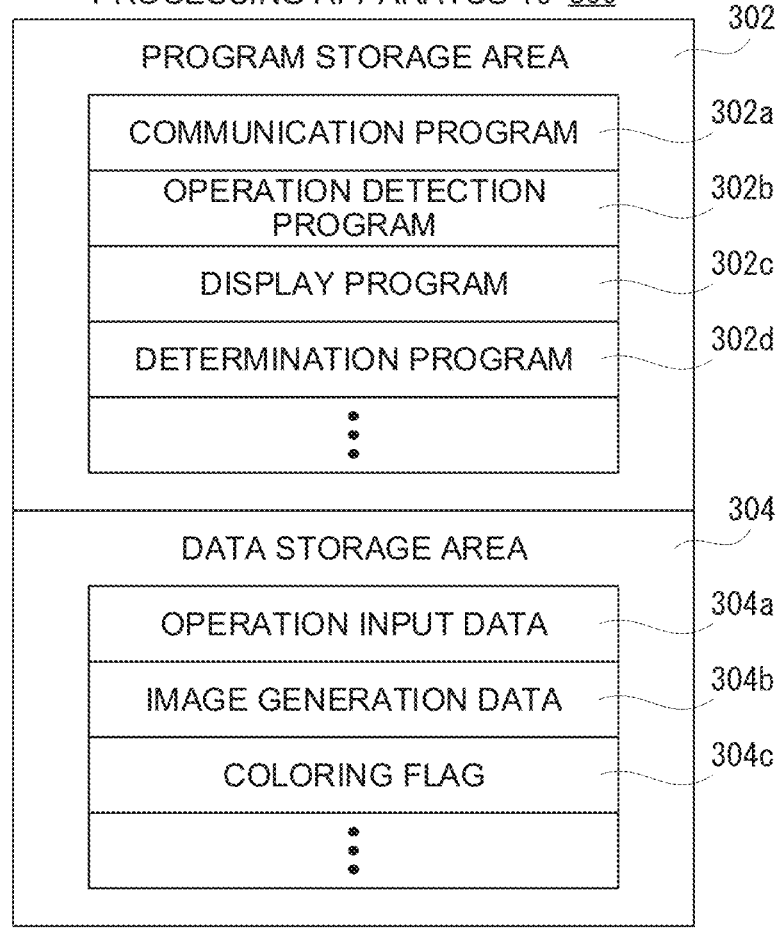
FIG. 9 is an illustrative view showing an example of a memory map of the RAM of the information processing apparatus illustrated in FIG. 2.

FIG. 9 is a diagram illustrating an example of a memory map 300 of the RAM 34 of the information processing apparatus 10 illustrated in FIG. 2. As illustrated in FIG. 9, the RAM 34 includes a program storage area 302 and a data storage area 304. As described above, the information processing program for the information processing apparatus 10 is stored in the program storage area 302 of the RAM 34. The information processing program for the information processing apparatus 10 includes a communication program 302a, an operation detection program 302b, a display program 302c, and a determination program 302d.

The communication program 302a is a program for communicating (transmitting and receiving) data with an image forming apparatus 70, an external computer such as a server, or another device via a network.

The operation detection program 302b is a program for detecting touch input and the CPU 32 acquires the touch coordinate data output from the touch panel 12 according to the operation detection program 302b, and the acquired touch coordinate data is stored in the RAM 34 in chronological order.

The display program 302c is a program for generating display image data, that is, screen data such as the various operation screens described above, and outputting the same to the display 14 by using the image generation data 304b described later. Further, the display program 302c is a program for changing the display colors of the operation guidance portion and the guidance target key displayed on each operation screen (at least a part of the operation guidance portion and the first type of operation key are colored in the first color), changing the display color of the setting key, and changing the display mode of the progress display bar 126 according to the progress of the setting operation.

The determination program 302d is a program for determining whether or not to proceed to the next operation screen (whether to color the first type of operation key in the first color). Further, the determination program 302d is a program for determining, when there exists a setting key that is included as the first type of operation key, whether the setting key included in the first type operation key is operated (whether to color a part of the setting key included as the first type of operation key in the first color).

Although not shown, the program storage area 302 stores programs such as a program for setting charges for services and the like in the information processing system 100, a storage medium connection program for controlling the writing of data to various storage media mounted on the storage medium connection unit 16, and the reading of data from the various storage media, a paper-piece printing program for controlling a paper-piece printer 18 to print character strings, images, bar codes, etc. on roll paper, a code reading program for controlling a code reader 20 to extract a code image from a photographic image taken by a laser scanner or a camera and decode the extracted code image, a photograph printing program for controlling a photographic printer 26 is to print an image on photograph paper, a short-range communication program for controlling a short-range communication unit 22 to realize data communication with a communication target (for example, an identification card, a membership card, an electronic money medium, etc.), a money processing program which is a program for controlling a currency processing unit 24 to calculate the amount of inserted money and return the coins from the coin return port 24b according to the remaining balance after the charges for predetermined services, and the like, are deducted from the amount of inserted money, as well as for returning a bill from the bill insertion port, and a program for selecting and executing various functions included in the information processing apparatus 10.

Further, the operation input data 304a, the image generation data 304b, the coloring flag 304c, and the like are stored in the data storage area 304 of the RAM 34. The operation input data 304a is data in which touch coordinate data detected according to the operation detection program 302b is stored in chronological order. The image generation data 304b is display image data corresponding to various screens displayed on the display 14. The coloring flag 304c is flag data for determining whether or not to color the guidance target keys, such as the transition key or the setting key, in the first color.

Although not shown, the data storage area 304 stores other data necessary for executing the information processing program for the information processing apparatus 10, and provides timers (counters) and registers, and the like, necessary for executing the information processing program for the information processing apparatus 10.

Figure 10:
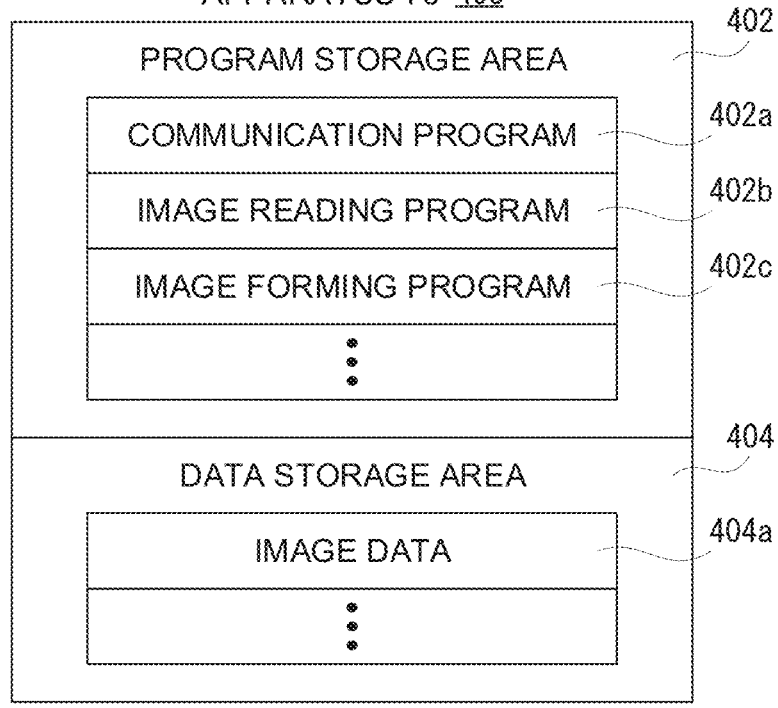
FIG. 10 is an illustrative view showing an example of a memory map of the RAM of the image forming apparatus illustrated in FIG. 3.

FIG. 10 is a diagram illustrating an example of a memory map 400 of a RAM 84 of the image forming apparatus 70 shown in FIG. 3. As illustrated in FIG. 10, the RAM 84 includes a program storage area 402 and a data storage area 404. As described above, the information processing program for the image forming apparatus 70 is stored in the program storage area 402 of the RAM 84. The information processing program for the image forming apparatus 70 includes a communication program 402a, an image reading program 402b, and an image forming program 402c.

The communication program 402a is a program for communicating with an external computer such as an information processing apparatus 10 or a server or another device via a network.

The image reading program 402b is a program for controlling the image reader 72 to read (scan) the image of the document placed on the document mounting table in order to output the image signal (scanned image data) corresponding to the read image.

The image forming program 402c is a program for controlling the image forming unit 74 to form a multicolored or monochromatic image on a recording medium (paper) according to the image data 404a such as scanned image data or input image data.

Although not shown, programs for selecting and executing various functions included in the image forming apparatus 70 are also stored in the program storage area 402.

Further, image data 404a and the like are stored in the data storage area 404 of the RAM 84. The image data 404a is image data read by the image reader 72, image data input from an external computer such as a server, or the like.

Although not shown, the data storage area 404 stores other data necessary for executing the information processing program for the image forming apparatus 70, and provides timers (counters) and registers, and the like, necessary for executing the information processing program for the image forming apparatus 70.

Figure 11:
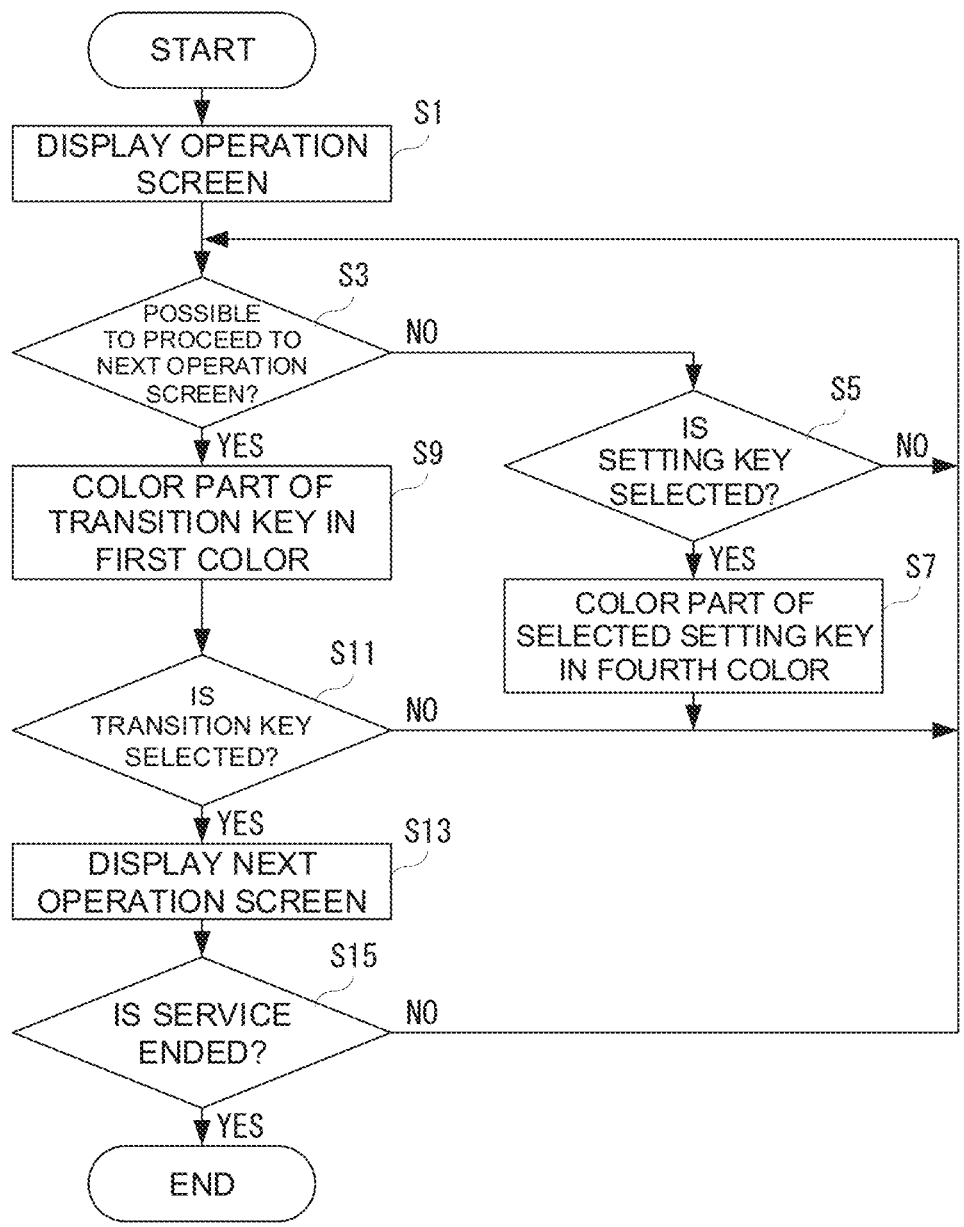
FIG. 11 is a flow chart showing an example of information processing of the CPU shown in FIG. 2.

FIG. 11 is a flow chart showing an example of information processing executed by the CPU 32 of the information processing apparatus 10 shown in FIG. 2. This information processing starts when a service is selected.

As shown in FIG. 11, when the CPU 32 of the information processing apparatus 10 starts information processing, the first operation screen among the plurality of operation screens for setting the selected service is displayed on the display 14 in step S1, and whether it is possible to proceed to the next operation screen is determined in step S3.

If it is "NO" in step S3, that is, if it is determined that it is not possible to advance to the next operation screen, it is determined in step S5 whether the setting key is selected. If it is "NO" in step S5, if it is determined that the setting key is not selected, the process returns to step S3. On the other hand, if it is "YES" in step S5, that is, if it is determined that the setting key has been selected, a part of the selected setting key is colored in the fourth color in step S7, and the process returns to step S3.

On the other hand, if it is "YES" in step S3, that is, when it is determined that it is possible to advance to the next operation screen, a part of the transition key, which is the first type of operation key, is colored in the first color in step S9, and it is determined whether the transition key has been selected, in step S11.

If it is "NO" in step S11, that is, if it is determined that the transition key is not selected, the process returns to step S3. On the other hand, if it is "YES" in step S11, that is, if it is determined that the transition key has been selected, the next operation screen is displayed in step S13, and it is determined whether the service is to be terminated in step S15.

If it is "NO" in step S15, that is, if it is determined that the service is not to be terminated, the process returns to step S3. On the other hand, if it is "YES" in step S15, that is, if it is determined that the service is to be terminated, the information processing is terminated.

In this first embodiment, a part of the operation guidance portion 122, including the message 122a for providing the operation guidance to the user, and the first type of operation keys, among the plurality of operation keys, are colored in the first color; the operation keys other than the first type of operation keys (the second type of operation keys), among the plurality of operation keys on the operation screen, are colored in a color different from the first color. Therefore, a user of the information processing system 100 can intuitively recognize that the first type of operation key is a key to be operated (guidance target key) and thereby operability in the operation screen can be improved.

Second Embodiment

The information processing apparatus 10 of the second embodiment is the same as that of the first embodiment except that a guidance image for recognizing the operation key to be operated by the user is displayed on each operation screen. The contents different from those of the first embodiment will be described, and duplicate descriptions will be omitted.

An operation example of the information processing system 100 of the second embodiment will be described with reference to FIGS. 12 to 14. In the second embodiment, a guidance image is displayed for making the user recognize which operation key to operate. Hereinafter, the color setting screen 120 and the guidance screen 130 will be described as an example.

Figure 12:
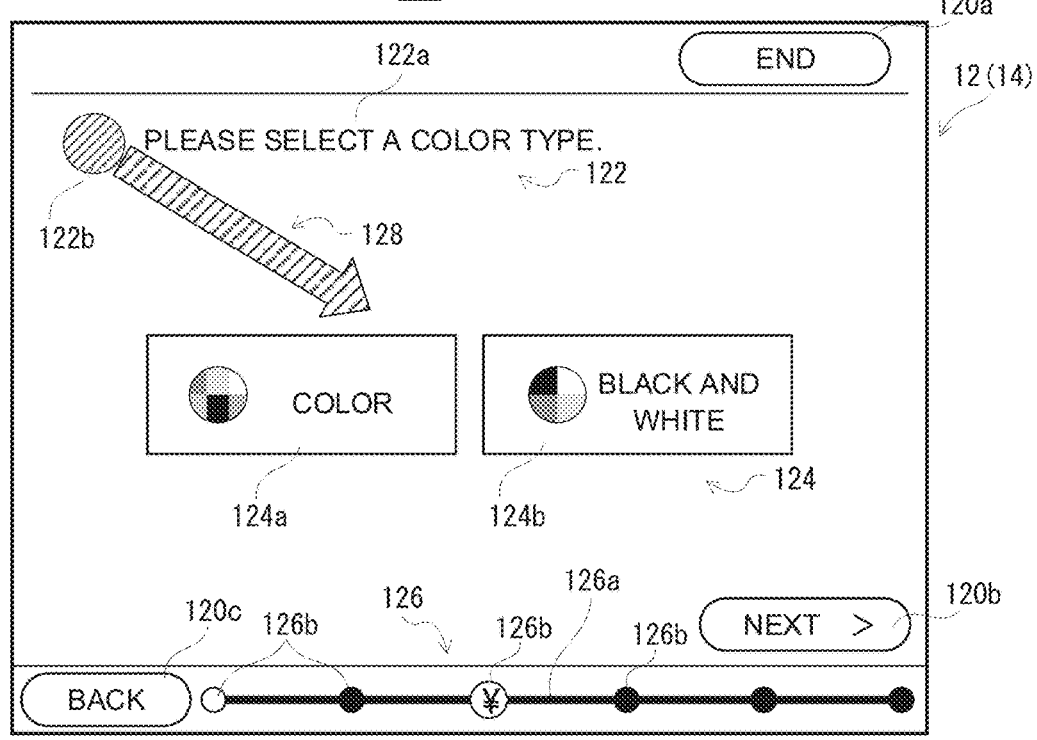
FIG. 12 is an illustrative view showing an example of a color setting screen in the second embodiment.

FIG. 12 shows an example of the color setting screen 120 in the initial state. As described in the first embodiment, the color setting screen 120 is a screen for setting operating conditions of the service. Therefore, until the color condition is set, that is, until any of the setting keys 124*a* and 124*b* is operated, the transition key 120*b* is disabled and colored in a color different from the first color (for example, a third color). Further, the setting keys 124*a* and 124*b* are also colored in a color different from the first color (for example, a third color).

On the screens for setting the operating conditions of the service, such as the color setting screen 120, in order to advance to the next operation screen, it is necessary to operate the setting keys (for example, on the color setting screen 120, the setting keys 124*a* and 124*b*). On the color setting screen 120 in the initial state, a guidance image 128 is displayed for making the user recognize that the setting keys 124*a* and 124*b* are operation keys to be operated. For example, as the guidance image 128, an image of an arrow extending from the operation guidance portion 122 toward the setting keys 124*a* and 124*b* (setting unit 124) is displayed. Specifically, as the guidance image 128, an image of an arrow is displayed extending from a portion of the operation guidance portion 122, colored in the first color, (indicator image 122*b* in FIG. 12) toward the setting keys 124*a* and 124*b* (setting unit 124). Therefore, the user can intuitively recognize that the setting keys 124*a* and 124*b* are the next operation keys to operate.

Figure 13:
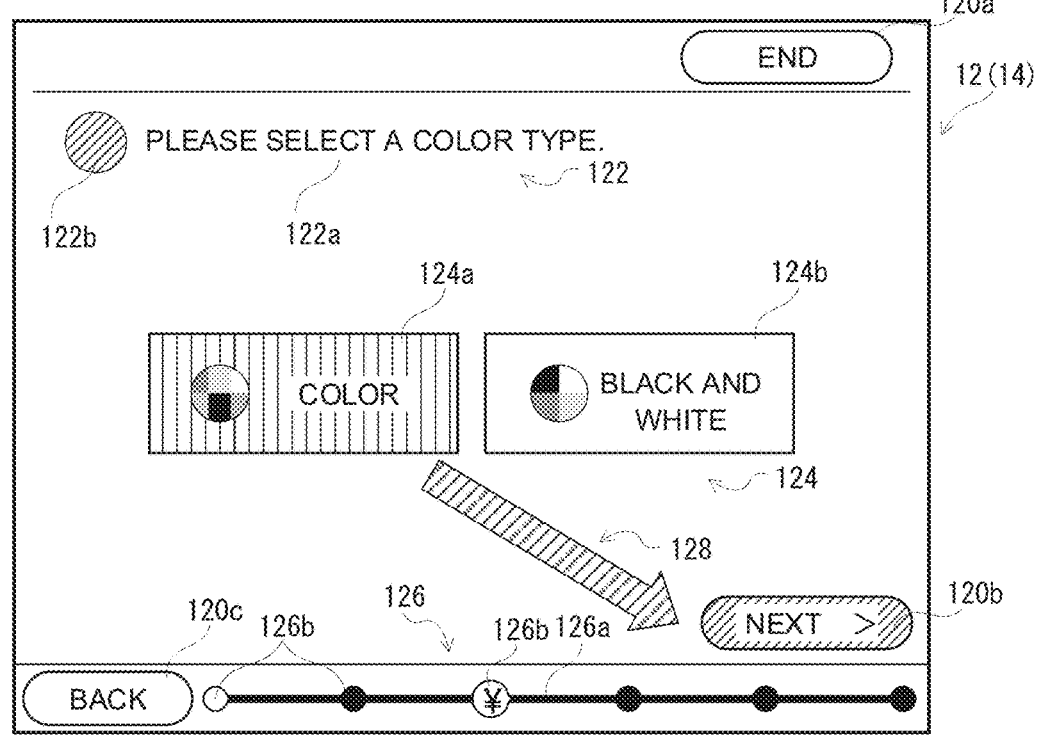
FIG. 13 is an illustrative view showing another example of a color setting screen in the second embodiment.

Next, FIG. 13 shows an example of the color setting screen 120 when the setting key 124*a* is operated. As described in the first embodiment, when the setting key 124*a* is operated, a part of the setting key 124*a* is colored in the fourth color. Further, when the setting key 124*a* is operated, it becomes possible to proceed to the next operation screen, and a part of the transition key 120*b*, which is the first type of operation key, is colored in the first color. On the color setting screen 120 in this state, the guidance image 128 is displayed for making the user recognize that the transition key 120*b* is an operation key to be operated. In this case, as the guidance image 128, an image of an arrow is displayed extending from the selected setting key (the setting key colored in the fourth color, setting key 124*a* in the example shown in FIG. 13) toward the transition key 120*b*. Therefore, the user can intuitively recognize that the transition key 120*b* is the next operation key to operate.

Figure 14:
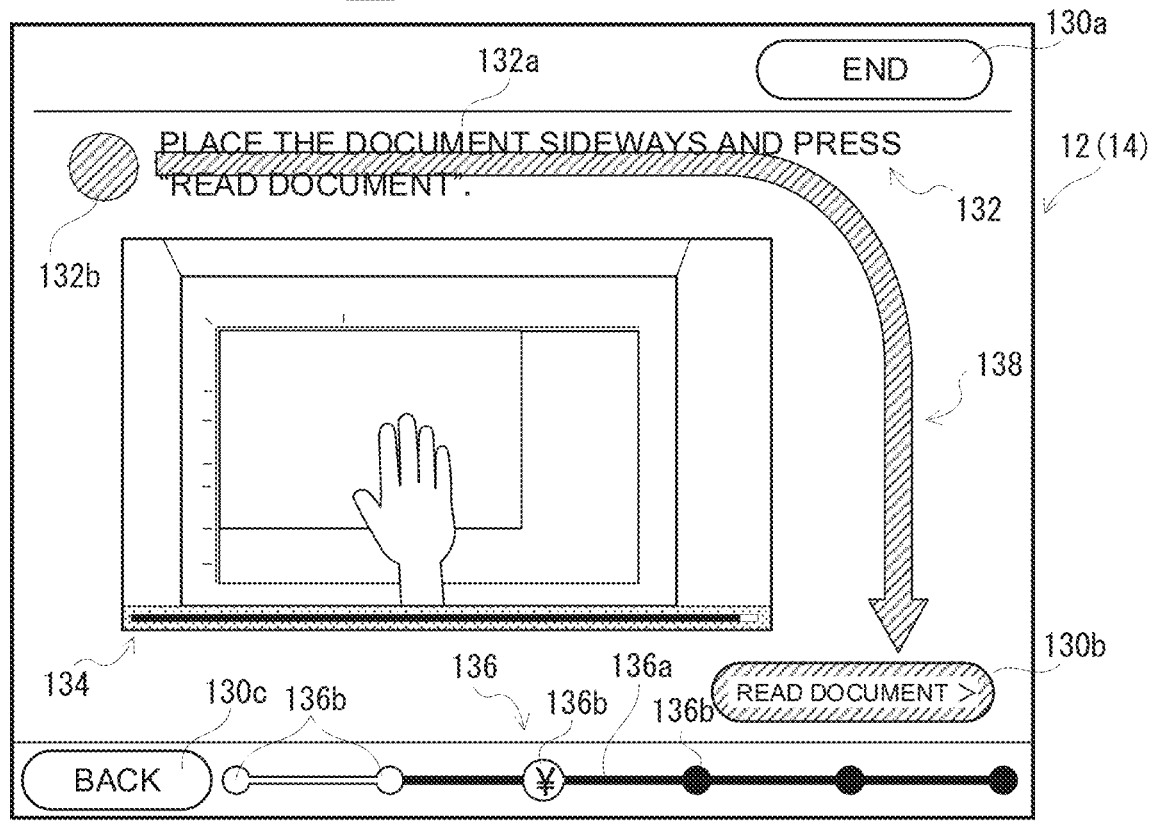
FIG. 14 is an illustrative view showing an example of a guidance screen in the second embodiment.

FIG. 14 shows an example of the guidance screen 130. As described in the first embodiment, the guidance screen 130 is not a screen for setting the operating conditions of the service. Therefore, on the guidance screen 130, the transition key 130*b*, which is the first type of operation key, is enabled (colored in the first color) from the beginning, and it is possible to advance to the next operation screen from the beginning. On the guidance screen 130, a guidance image 138 is displayed for the user to recognize that the transition key 130*b* is an operation key to be operated. In this case, as the guidance image 138, an image of an arrow is displayed extending from the portion of the operation guidance portion 132 colored in the first color (indicator image 132*b* in FIG. 14) toward the transition key 130*b*. Therefore, the user can intuitively recognize that the transition key 130*b* is the next operation key to operate.

However, the guidance image 138 is displayed so as not to overlap with the placement method guidance portion 134 for giving guidance on the operation method, or the like, to the user. For example, the guidance image 138 is displayed so as to avoid the display area of the guidance image of the placement method guidance portion 134.

Hereinafter, the information processing in the second embodiment will be described using a flow chart, but the processes which are the same as in the information processing described in the first embodiment will be given the same reference numerals and the description will be omitted or will be described briefly for duplicated content.

FIG. 15 is a flow chart showing an example of information processing in the second embodiment. As shown in FIG. 15, when the CPU 32 starts information processing, when step S3 is "NO", the CPU 32 displays a guidance image oriented toward the setting key in step S31 and proceeds to step S5. On the other hand, if it is "YES" in step S3, a part of the transition key, which is the first type of operation key, is colored in the first color in step S9, and the guidance image oriented toward the transition key is displayed in step S33, and the process proceeds to step S11.

Since the contents of the processes from step S1 to step S15 are the same as those in the first embodiment, the description thereof will be omitted.

According to this second embodiment, the user can be made to recognize which key to operate on each operation screen.

The specific configuration and the like given in the above-described embodiment are examples, and can be appropriately changed according to the actual product.

Further, in the above-described embodiment, the information processing apparatus 10 includes a display 14 with a touch panel 12, and an operation screen is displayed on the display 14, but the present invention is not limited to this. For example, the image forming apparatus 70 may include a display with a touch panel (corresponding to the first display). In this case, the display 14 with the touch panel 12 of the information processing apparatus 10 may be omitted, or the information processing apparatus 10 may include the display 14 with the touch panel 12 (a configuration where both the information processing apparatus 10 and the image forming apparatus 70 include a display with a touch panel). However, when the display 14 with the touch panel 12 of the information processing apparatus 10 is omitted, the operation screen is displayed on the display of the image forming apparatus 70. Further, when both the information processing apparatus 10 and the image forming apparatus 70 include a display with a touch panel, the operation screen may be displayed on each display, or the operation screen may be displayed on one of the displays. When the operation screen is displayed on the display of the image forming apparatus 70, the user can set a job or the like on the relevant operation screen by touch input into the touch panel of the image forming apparatus 70.

Further, in the above-described embodiment, in the operation screen for setting the operating conditions of the service, the transition key is disabled until the operating condition of the service is set, but the transition key may also be enabled (a part of the transition key being colored in the first color) from the time when the operation screen for setting the operating conditions of the service is displayed.

Furthermore, in the above-described embodiment, a plurality of operation keys are displayed on the operation screen, but only one operation key may be displayed on the operation screen. In this case, one operation key displayed on the operation screen may be the first type of operation key colored in the first color.

DESCRIPTION OF REFERENCE NUMERALS

10 Information processing apparatus
12 Touch panel
14 Display
32 CPU
34 RAM
36 ROM
70 Image forming apparatus

What is claimed is:

1. An information processing apparatus that provides a predetermined service to a user, the information processing apparatus comprising:
a display; and
a display controller that displays, on the display, an operation screen for executing the predetermined service, wherein
displayed on the operation screen are a colored portion that is colored in a first color and an operation key that accepts user operations, the colored portion being displayed in a portion of the operation screen other than the operation key,
the display controller colors, when the operation key is operated, the operated operation key in the first color, and
the display controller colors, in the first color, a transition key to which a function for advancing to a next operation screen is assigned, or colors, in the first color, a read start key for accepting an operation to start reading of a document when the operation key is operated.

2. The information processing apparatus according to claim 1, wherein a message that provides operation guidance to the user is displayed, and the colored portion is adjacent to the message.

3. The information processing apparatus according to claim 1, wherein a display area of the display is rectangular,
the colored portion is arranged along a first side of the display area, and
the transition key or the read start key is arranged along a second side, among sides of the display area, opposite the first side.

4. The information processing apparatus according to claim 1, wherein
a back key for returning to a previous operation screen is not colored in the first color.

5. The information processing apparatus according to claim 1, wherein the colored portion is displayed on the next operation screen at a position near, or the same as, a position of the colored portion on the operation screen.

6. The information processing apparatus according to claim 1, wherein the transition key or the read start key is colored such that when a part of the transition key or a part of the read start key is colored in the first color, another part of the transition key or another part of the read start key is colored in a second color different than the first color.

7. An information processing apparatus that provides a predetermined service to a user, the information processing apparatus comprising:
a display; and
a display controller that displays, on the display, an operation screen for executing the predetermined service, wherein
displayed on the operation screen are a colored portion that is colored in a first color and an operation key that accepts user operations, the colored portion being displayed in a portion of the operation screen other than the operation key,
the display controller colors, when the operation key is operated, the operated operation key in the first color,
the display controller switches and displays a plurality of operation screens on the display, and
when a condition for advancing to a next operation screen is satisfied, a transition key to which a function for advancing to the next operation screen is colored in the first color.

8. The information processing apparatus according to claim 7, wherein a message that provides operation guidance to the user is displayed, and the colored portion is adjacent to the message.

9. The information processing apparatus according to claim 7, wherein a display area of the display is rectangular,
the colored portion is arranged along a first side of the display area, and
the transition key or a read start key for accepting an operation to start reading of a document is arranged along a second side, among sides of the display area, opposite the first side.

10. The information processing apparatus according to claim 7, wherein
a back key for returning to a previous operation screen is not colored in the first color.

11. The information processing apparatus according to claim 7, wherein the transition key or a read start key for accepting an operation to start reading of a document is colored such that when a part of the transition key or a part of the read start key is colored in the first color, another part of the transition key or another part of the read start key is colored in a second color different than the first color.

12. An information processing apparatus that provides a predetermined service to a user, the information processing apparatus comprising:
a display; and
a display controller that displays, on the display, an operation screen for executing the predetermined service, wherein
displayed on the operation screen are a colored portion that is colored in a first color and an operation key that accepts user operations, the colored portion being displayed in a portion of the operation screen other than the operation key,
the display controller colors, when the operation key is operated, the operated operation key in the first color, and
a transition key to which a function for advancing to a next operation screen or a read start key for accepting an operation to start reading of a document is disabled before the operation key is operated, and is enabled when the operation key is operated.

13. The information processing apparatus according to claim 12, wherein a message that provides operation guidance to the user is displayed, and the colored portion is adjacent to the message.

14. The information processing apparatus according to claim 12, wherein a display area of the display is rectangular,
the colored portion is arranged along a first side of the display area, and
the transition key or the read start key is arranged along a second side, among sides of the display area, opposite the first side.

15. The information processing apparatus according to claim 12, wherein
a back key for returning to a previous operation screen is not colored in the first color.

16. The information processing apparatus according to claim 12, wherein the transition key or the read start key is colored such that when a part of the transition key or a part of the read start key is colored in the first color, another part of the transition key or another part of the read start key is colored in a second color different than the first color.

* * * * *